United States Patent
Knowlton et al.

(10) Patent No.: US 6,221,187 B1
(45) Date of Patent: *Apr. 24, 2001

(54) METHOD OF SAFELY INITIATING COMBUSTION OF A GAS GENERANT COMPOSITION USING AN AUTOIGNITION COMPOSITION

(75) Inventors: Gregory D. Knowlton, Chandler; Christopher P. Ludwig, Fountain Hills, both of AZ (US)

(73) Assignee: Talley Defense Systems, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/234,884

(22) Filed: Jan. 21, 1999

Related U.S. Application Data

(63) Continuation-in-part of application No. 09/010,832, filed on Jan. 22, 1998, which is a continuation-in-part of application No. 08/791,176, filed on Jan. 30, 1997, now Pat. No. 5,739,460, which is a division of application No. 08/645,945, filed on May 14, 1996, now Pat. No. 5,959,249.

(51) Int. Cl.$^7$ .................................................. C06B 33/08
(52) U.S. Cl. ................................ 149/38; 149/37; 149/43; 149/45; 149/47; 149/41; 149/76; 149/77; 102/205
(58) Field of Search ................................ 149/38, 37, 47, 149/43, 77, 41; 102/329, 205

(56) References Cited

U.S. PATENT DOCUMENTS

| | | | |
|---|---|---|---|
| 3,609,115 | 9/1971 | Sammons | 260/32.4 |
| 3,890,174 | 6/1975 | Helms, Jr. et al. | 149/44 |
| 5,084,118 | * 1/1992 | Poole | 149/22 |
| 5,380,380 | * 1/1995 | Poole et al. | 149/36 |
| 5,429,691 | 7/1995 | Hinshaw et al. | 149/45 |
| 5,439,537 | 8/1995 | Hinshaw et al. | 149/22 |
| 5,482,579 | 1/1996 | Ochi et al. | 149/83 |
| 5,538,567 | 7/1996 | Henry, III et al. | 149/18 |
| 5,542,688 | 8/1996 | Scheffee | 280/741 |
| 5,739,460 | * 4/1998 | Knowlton et al. | 149/45 |
| 5,780,768 | * 7/1998 | Knowlton et al. | 149/36 |
| 5,866,842 | * 2/1999 | Wilson et al. | 149/46 |
| 5,959,242 | * 9/1999 | Knowlton et al. | 149/37 |

* cited by examiner

Primary Examiner—Edward A. Miller

(57) ABSTRACT

The present invention relates to a low temperature autoignition composition for safely initiating combustion of a main pyrotechnic charge in a gas generator or pyrotechnic device exposed to flame or a high temperature environment. The low temperature autoignition compositions of the invention include a mixture of an oxidizer and a powdered metal, wherein the oxidizer includes a comelt or mixture comprising ammonium nitrate and at least one of an alkali metal nitrate, an alkaline earth metal nitrate, a complex salt nitrate, a dried, hydrated nitrate, an alkali metal chlorate, an alkali metal perchlorate, an alkaline earth metal chlorate, an alkaline earth metal perchlorate, ammonium perchlorate, sodium nitrite, potassium nitrite, silver nitrite, a complex salt nitrite, a solid organic nitrate, a solid organic nitrite, or a solid organic amine, and where the metal fuel and oxidizer are present in amounts sufficient to provide an autoignition composition having an autoignition temperature of no more than about 232° C. The present invention also relates to a method for initiating a gas generating composition or pyrotechnic composition in a gas generator or pyrotechnic device exposed to flame or a high temperature environment. In the method of the invention, the gas generating composition or pyrotechnic composition is placed in thermal contact with a low temperature autoignition composition of the invention.

31 Claims, No Drawings

നഥോഡ് OF SAFELY INITIATING COMBUSTION OF A GAS GENERANT COMPOSITION USING AN AUTOIGNITION COMPOSITION

CROSS REFERENCE TO RELATED APPLICATIONS

This application is a continuation-in-part of U.S. application Ser. No. 09/010,823, filed Jan. 22, 1998, which is a continuation-in-part of U.S. application Ser. No. 08/791,176, filed on Jan. 30, 1997, now U.S. Pat. No. 5,739,460, which is a division of U.S application Ser. No. 08/645,945, filed on May 14, 1996, now U.S. Pat. No. 5,959,249.

FIELD OF THE INVENTION

The invention relates to gas generating compositions, such as those used in "air bag" passive restraint systems, and, in particular, to autoignition compositions that provide a means for initiating combustion of a main pyrotechnic charge in a gas generator or pyrotechnic device exposed to temperatures significantly above the temperatures at which the unit is designed to operate.

BACKGROUND OF THE INVENTION

One method commonly used for inflating air bags in vehicle passive restraint systems involves the use of an ignitable gas generating composition that generates an inflating gas due to an exothermic reaction occurring upon deflagration of the composition. Because of the nature of passive restraint systems, the gas must be generated, and the air bag deployed in a matter of milliseconds. For example, under representative conditions, only about 60 milliseconds elapse between primary and secondary collisions in a motor vehicle accident, i.e., between the collision of the vehicle with another object and the collision of the driver or passenger with either the air bag or a portion of the vehicle interior.

In addition, the inflation gas must meet several stringent requirements. The gas must be non-toxic, non-noxious, must have a generation temperature that is low enough to avoid burning the passenger and the air bag, and it must be chemically inert so that it is not detrimental to the mechanical strength or integrity of the bag.

The stability and reliability of gas generating compositions over the life of the vehicle are also extremely important. The gas generating composition must be stable over a wide range of temperature and humidity conditions, and must be resistant to shock, so that it is virtually impossible for the gas generating composition to be set off except when the passive restraint system is activated in the event of a collision.

Typically, the inflation gas is nitrogen, which is produced by the decomposition reaction of a gas generating composition containing a metal azide. One such gas generating composition is disclosed in Reissued U.S. Pat. No. Re. 32,584. The solid reactants of the composition include an alkali metal azide and a metal oxide, and are formulated to ignite at an ignition temperature of over about 315° C.

The gas generating composition is typically stored in a metal inflator unit mounted in the steering wheel or dashboard of the vehicle. Several representative inflator units are disclosed in U.S. Pat. Nos. 4,923,212, 4,907,819, and 4,865,635. The combustion of the gas generating composition in these devices is typically initiated by an electrically activated initiating squib, which contains a small charge of an electrically ignitable material, and is connected by electrical leads to at least one remote collision sensing device.

Due to the emphasis on weight reduction for improving fuel mileage in motorized vehicles, inflator units are often formed from light weight materials, such as aluminum, that can lose strength and mechanical integrity at temperatures significantly above the normal operating temperature of the unit. Although the temperature required for the unit to lose strength and mechanical integrity is much higher than will be encountered in normal vehicle use, these temperatures are readily reached in, for example, a vehicle fire. As the operating pressure of standard pyrotechnics increases with increasing temperature, a gas generating composition at its autoignition temperature will produce an operating pressure that is too high for a pressure vessel that was designed for minimum weight. Moreover, the melting point of many non-azide gas generating compositions is low enough for the gas generating composition to be molten at the autoignition temperature of the composition, which can result in a loss of ballistic control and excessive operating pressures. Therefore, in a vehicle fire, the ignition of the gas generating composition can result in an explosion in which fragments of the inflation unit are propelled at dangerous and potentially lethal velocities.

To prevent such explosions, air bag systems have typically included inflators containing an autoignition composition that will autoignite and initiate the combustion of the main gas generating pyrotechnic charge at a temperature below that at which the shell or housing begins to soften and lose structural integrity. The number of autoignition compositions available in the prior art is limited, and includes nitrocellulose and mixtures of potassium chlorate and a sugar. However, nitrocellulose decomposes with age, so that the amount of energy released upon autoignition decreases, and may become insufficient to properly ignite the main gas generating composition charge. Moreover, prior art autoignition compositions have autoignition temperatures that are too high for some applications, e.g., non-azide auto air bag main charge generants.

Therefore, a need exists for a stable autoignition composition that is capable of igniting the gas generating composition at a temperature that is sufficiently low that the inflator unit maintains mechanical integrity at the autoignition temperature, but which is significantly higher than the temperatures reached under normal vehicle operating conditions.

SUMMARY OF THE INVENTION

The present invention relates to an autoignition composition for safely initiating combustion in a main pyrotechnic charge in a gas generator or pyrotechnic device exposed to flame or a high temperature environment. The autoignition compositions of the invention comprise a mixture of an oxidizer and a powdered metal fuel, where the oxidizer comprises a mixture or comelt comprising ammonium nitrate and at least one of an alkali metal or an alkaline earth metal nitrate, ammonium nitrate, a complex salt nitrate, such as $Ce(NH_4)_2(NO_3)_6$ or $ZrO(NO_3)_2$, a dried, hydrated nitrate, such as $Ca(NO_3)_2 \cdot 4H_2O$ or $Cu(NO_3)_2 \cdot 2.5\ H_2O$, silver nitrate, an alkali or alkaline earth metal chlorate or perchlorate, ammonium perchlorate, a nitrite of sodium, potassium, or silver, a solid organic nitrate, nitrite, or amine, such as guanidine nitrate, nitroguanidine and 5-aminotetrazole, respectively, or a comelt or mixture thereof.

Preferably, the oxidizer comprises a comelt or mixture comprising ammonium nitrate and at least one of an alkali metal nitrate, an alkaline earth metal nitrate, silver nitrate, a complex salt nitrate, a dried, hydrated nitrate, an alkali metal chlorate, an alkali metal perchlorate, an alkaline earth metal chlorate, an alkaline earth metal perchlorate, ammonium perchlorate, sodium nitrite, potassium nitrite, silver nitrite, a complex salt nitrite, a solid organic nitrate, a solid organic nitrite, or a solid organic amine, and the metal fuel and oxidizer are present in amounts sufficient to provide an autoignition composition having an autoignition temperature of no more than about 232° C. Particularly useful oxidizers are comelts or mixtures comprising ammonium nitrate and at least one of guanidine nitrate, nitroguanidine, tetramethyl ammonium nitrate, 5-aminotetrazole, and barbituric acid.

Typically, the autoignition temperature, the temperature at which the autoignition compositions of the invention spontaneously ignite or autoignite, is between about 70° C. and about 232° C. To obtain the desired autoignition temperature, the autoignition compositions of the invention may further comprise an alkali or alkaline earth chloride, fluoride, or bromide comelted with a nitrate, nitrite, chlorate, or perchlorate in addition to the oxidizer and fuel, such that the autoignition composition has a eutectic or peritectic in the range of about 70° C. to about 250° C. In addition, for compositions with low output energy, an output augmenting composition, which comprises an energetic oxidizer of ammonium perchlorate or an alkali metal chlorate, perchlorate or nitrate, in combination with a metal, may be added to the composition.

The powdered metals useful as fuel in the present invention include molybdenum, magnesium, calcium, strontium, barium, titanium, zirconium, vanadium, niobium, tantalum, chromium, tungsten, manganese, iron, cobalt, nickel, copper, zinc, cadmium, tin, antimony, bismuth, aluminum, cerium, and silicon. It should be noted that molybdenum appears to be unique in its reactivity with the oxidizers described above, and is therefore the preferred metal fuel.

In autoignition compositions comprising a molybdenum fuel, the amount of molybdenum may be varied to adjust the autoignition temperature. If the amount of molybdenum is greater than the stoichiometric amount, the autoignition temperature of the autoignition composition will typically decrease as the amount of molybdenum is increased.

The present invention also relates to a method for safely initiating combustion of a gas generating composition or pyrotechnic composition in a gas generator or pyrotechnic device having a housing when the gas generator or pyrotechnic device is exposed to flame or a high temperature environment. The method of the invention comprises forming an autoignition composition, as described above, and placing the autoignition composition in thermal contact with the gas generating composition or pyrotechnic composition within the gas generator or pyrotechnic device, such that the autoignition composition autoignites and initiates combustion of the gas generating composition or pyrotechnic composition when the gas generator or pyrotechnic device is exposed to flame or a high temperature environment. The method of the invention may also include the step of mixing the autoignition composition with an output augmenting composition, as described above, such that the autoignition composition autoignites and initiates combustion of the output augmenting composition, which, in turn, initiates combustion of the gas generating composition or pyrotechnic composition when the gas generator or pyrotechnic device is exposed to flame or a high temperature environment.

DETAILED DESCRIPTION OF THE INVENTION

The autoignition compositions of the invention are suitable for use with a variety of gas generating and pyrotechnic devices, in particular, vehicle restraint system air bag inflators. The autoignition compositions ensure that the gas generating or pyrotechnic device functions properly and safely when exposed to a high temperature environment, i.e., that combustion of the main pyrotechnic charge is initiated at a temperature below the temperature at which the material used to form the shell or housing begins to weaken or soften. If the autoignition composition is not utilized, the device may not function properly or safely if exposed to high heat or flame, because the operating pressure of standard pyrotechnics increases with increasing temperature. Therefore, a gas generating composition at its autoignition temperature can produce an operating pressure that is too high for a pressure vessel that was designed for minimum weight, i.e., which is formed of a material lacking the physical strength of the prior art stainless steel inflators. Moreover, the melting point of many non-azide gas generating compositions is low enough for the gas generating composition to be molten at the autoignition temperature of the composition, which can result in a loss of ballistic control and excessive operating pressures. As a result, under high temperature conditions the components of the gas generating composition or pyrotechnic composition within the device can decompose, melt, or sublime, and burn at an accelerated rate, resulting in an explosion that would destroy the device, and could possibly propel harmful or lethal fragments. The autoignition compositions of the invention provide an effective means for preventing such a catastrophic occurrence.

The pyrotechnic autoignition compositions of the invention provide several advantages over typical autoignition materials currently in use, such as nitrocellulose, including a lower autoignition temperature and better thermal stability. The preferred compositions autoignite over a narrow temperature range, and provide extremely repeatable performance. The complete series of compositions described and claimed herein has a wide range of autoignition temperatures that can be tailored for particular applications. The autoignition compositions also may have low to moderate hazard sensitivities, i.e., DOT 1.3c or lower.

The autoignition compositions of the invention comprise a mixture of a powdered metal fuel and an oxidizer, where the oxidizer comprises at least one of an alkali metal or alkaline earth metal nitrate, silver nitrate, ammonium nitrate, alkali or alkaline earth metal chlorate or perchlorate, ammonium perchlorate, nitrite of sodium, potassium, or silver, or a complex salt nitrate, such as ceric ammonium nitrate, $Ce(NH_4)_2(NO_3)_6$, or zirconium oxide dinitrate, $ZrO(NO_3)_2$. Particularly useful oxidizers include mixtures or comelts of ammonium nitrate and one of the other oxidizers listed above. As used herein, the term "powdered metal" encompasses metal powders, particles, prills, flakes, and any other form of the metal that is of the appropriate size and/or surface area for use in the present invention, i.e., typically, having a largest dimension of less than about 100 microns. In the most preferred compositions, the fuel is molybdenum ground to a particle size of less than about 6 microns. When more than one oxidizer is used in the composition, they may be provided either as a mixture or a comelt. Comelts have eutectics and/or peritectics in the range of about 70° to 250° C.

Solid organic nitrates, $R-(ONO_2)_x$, nitrites, $R-(NO_2)_x$, and amines $R-(NH_2)_x$, can also be used in the oxidizer component, typically, in a composition comprising ammonium nitrate or in combination with one or more other solid organic nitrates, nitrites, or amines, or with one or more of the inorganic nitrates, nitrites, chlorates or perchlorates listed above, but preferably only as mechanical mixes because in some cases comelts of these solid organic materials with inorganic/organic oxidizers may produce unstable combinations. Preferably the solid organic nitrates, nitrites and amines that are useful in forming the autoignition compositions of the invention have melting points between about 70° C. and about 250° C. When heated, mixtures should preferably produce eutectics and peritectics in the range of about 70° C. to about 250° C. These mixtures may be combined with one or more of the metals disclosed herein, and can be used in a powdered, granular or pelletized form.

It has also been determined using selected hydrated metal nitrates, such as $Ca(NO_3)_2.4H_2O$ and $Cu(NO_3)_2.2.5\ H_2O$, that hygroscopic, low melting point metal nitrates can be dehydrated and stabilized relative to moisture absorption by comelting with anhydrous metal nitrates, such as those described above. It is believed that many other low melting point, hydrated metal nitrates of the general formula $M(NO_3)_x \cdot YH_2O$, including, but not limited to, the nitrates of chromium, manganese, cobalt, iron, nickel, zinc, cadmium, aluminum, bismuth, cerium and magnesium, can also be dehydrated and stabilized relative to moisture absorption and rehydration by comelting with anhydrous metal nitrates, nitrites, chlorates and/or perchlorates. These comelts can be combined with metals to produce low temperature, i.e., about 70° to about 232° C., autoignition compositions.

The output energy of certain autoignition compositions taught herein, in particular, certain nitrate/nitrite/metal systems, is very low, and may not be sufficient to ignite the main gas generating pyrotechnic charge or an ignition enhancer or ignition booster charge that may be used to ignite the main charge when the out put of the autoignition composition is low. Autoignition compositions of this type may require an output augmenting material or charge to initiate combustion of the enhancer and main pyrotechnic charge. The ignition train for such a composition is initiated when the autoignition composition is heated to the autoignition temperature and ignites. The heat generated by the combustion of the autoignition composition ignites the output augmenting material, which, in turn, ignites the enhancer and main pyrotechnic charge of the gas generating composition. The augmentation material can be a charge which is separate from the autoignition material, or is mixed in with the autoignition composition to boost its output. Typically, an output augmenting composition comprises an energetic oxidizer, such as ammonium perchlorate or alkali metal chlorate, perchlorate or nitrate, and a metal, such as, e.g., Mg, Ti, or Zr, or a nonmetal, such as boron.

In addition, the presence of certain metal oxides in a nitrate, nitrite, chlorate or perchlorate oxidizer mix or comelt of the invention can have a catalytic effect in lowering the autoignition temperature for the reaction of the oxidizer and the metal, which is equivalent to lowering the energy of activation. Metal oxides useful in the invention for this purpose include, but are not limited to $Al_2O_3$, $SiO_2$, $CeO_2$, and transition metal oxides, which include, but are not limited to $V_2O_5$, $CrO_3$, $Cr_2O_3$, $MnO_2$, $Fe_2O_3$, $Co_3O_4$, NiO, CuO, ZnO, $ZrO_2$, $Nb_2O_5$, $MoO_3$, and $Ag_2O$.

In the autoignition compositions of the invention, the nitrate, nitrite, chlorate or perchlorate component or components function as an oxidizer, and the metal serves as a fuel. For example, the reaction of a composition comprising a comelt of metal nitrates and a metal proceeds according to the general equation $$(Metal_1 Nitrate + Metal_2 Nitrate)_{(comelt)} + Metal_3 \rightarrow$$
$$Metal_1 Oxide + Metal_2 Oxide + Metal_3 Oxide + Nitrogen \qquad (I)$$

The driving force for this reaction appears to follow the activity series or electromotive series for metals, in which metallic elements higher in the series will displace, i.e., reduce, elements lower in the series from a solution or melt. In particular, oxidizer systems containing silver nitrate and/or silver nitrite will generally yield very efficient autoignition materials with respect to ease, rate, and intensity of reaction when compounded with metals which are high in the activity or electromotive series. For example, Mg, Al, Mn, Zn, Cr, Fe, Cd, Co, Ni, and Mo are all well above Ag in the series. A typical reaction is represented by equations II to V.

$$2AgNO_3 + Mg \rightarrow 2Ag + Mg(NO_3)_2 \qquad (II)$$

In this high temperature, molten salt environment neither the $Mg(NO_3)_2$ nor the Ag metal are stable, and a second reaction quickly occurs to produce metal and nitrogen oxides:

$$2Ag + Mg(NO_3)_2 \rightarrow Ag_2O + MgO + 2NO_2. \qquad (III)$$

When potassium nitrate is also present in the comelt, the following reaction also occurs.

$$9Mg + 2KNO_3 + 2NO_2 \rightarrow K_2O + 9MgO + 2N_2 \qquad (IV)$$

Summing equations II, III, and IV, yields a net reaction that was given in general terms as equation I. For a composition of silver nitrate, potassium nitrate and magnesium, the net reaction is $$2AgNO_3 + 2KNO_3 + 10Mg \rightarrow Ag_2O + K_2O + 10MgO + 2N_2. \qquad (V)$$

A comparison of Differential Scanning Calorimeter (DSC) and Calibrated Tube Furnace autoignition test results for inorganic, organic and mixed inorganic/organic nitrate, nitrite, chlorate and perchlorate oxidizer systems with selected metals, demonstrates that at least two different autoignition mechanisms may be involved. As described above, purely inorganic systems, e.g., $KNO_3/AgNO_3/Mo$, generally autoignite in the vicinity of a thermal event clearly visible on a DSC scan, such as a crystalline phase transition, a melting point, or a eutectic or peritectic point. In some of the organic and mixed inorganic/organic systems it appears that autoignition of larger mass samples in the tube furnace can occur at much lower temperature than autoignition in the DSC without the presence of some small, lower temperature thermal event observed on the DSC. For example, the $CH_6N_4O_3/AgNO_3/Mo$ system autoignites at 170–174° C. by DSC analysis with no visible thermal events prior to autoignition. However, a 200 mg sample of the same composition autoignites in the tube furnace at 138–158° C., depending on percent composition. It is possible that this is more than just a mass effect, and the dramatic reduction in autoignition temperatures observed in tube furnace testing, as compared to the results obtained with DSC testing, is possibly the result of some catalytic, self heating, or other thermal effect.

The amount of the nitrate, nitrite, chlorate or perchlorate used in an autoignition composition can vary significantly. For purely inorganic systems, the mole percent or molar ratio of the nitrate, nitrite, chlorate or perchlorate oxidizer components in binary and ternary mixes and comelts should be stoichiometrically balanced with the metal or metals in the final autoignition composition, i.e., the molar amounts of the oxidizer and metal fuel are substantially proportional to the molar amounts given in the balanced chemical equation for the reaction of the oxidizer with the fuel. However, it appears that the autoignition temperature for organic/inorganic compositions comprising molybdenum metal can be tailored by adjusting the molybdenum metal content from stoichiometrically balanced to extremely metal (fuel) rich. As the molybdenum metal content is increased the autoignition temperature decreases. It is believed that this holds true for the other metal fuels described above.

The amount of each oxidizer component in a mixture or comelt depends on the molar amounts of the oxidizers at or near the eutectic point for the specific oxidizer mixture or comelt composition. As a result the nitrate, nitrite, chlorate or perchlorate oxidizer component or components will be the major component in some autoignition compositions of the invention, and the powdered metal fuel will be the major component in others. Those skilled in the art will be able to determine the required amount of each component from the stoichiometry of the autoignition reaction or by routine experimentation.

The preferred compositions comprise a comelt or mixture of ammonium nitrate, $NH_4NO_3$, and a nitrate of an alkali metal or an alkaline earth metal, preferably, lithium nitrate, $LiNO_3$, sodium nitrate, $NaNO_3$, potassium nitrate, $KNO_3$, rubidium nitrate, $RbNO_3$, cesium nitrate, $CsNO_3$, magnesium nitrate, $Mg(NO_3)_2$, calcium nitrate, $Ca(NO_3)_2$, strontium nitrate, $Sr(NO_3)_2$, or barium nitrate, $Ba(NO_3)_2$, a nitrite of sodium, $NaNO_2$, potassium, $KNO_2$, and silver, $AgNO_2$, a chlorate of an alkali metal or an alkaline earth metal, preferably lithium chlorate, $LiClO_3$, sodium chlorate, $NaClO_3$, potassium chlorate, $KClO_3$, rubidium chlorate, $RbClO_3$, calcium chlorate, $Ca(ClO_3)_2$, strontium chlorate, $Sr(ClO_3)_2$, or barium chlorate, $Ba(ClO_3)_2$, or a perchlorate of an alkali metal or an alkaline earth metal, preferably lithium perchlorate, $LiClO_4$, sodium perchlorate, $NaClO_4$, potassium perchlorate, $KClO_4$, rubidium perchlorate, $RbClO_4$, cesium perchlorate, $CsClO_4$, magnesium perchlorate, $Mg(ClO_4)_2$, calcium perchlorate, $Ca(ClO_4)_2$, strontium perchlorate, $Sr(ClO_4)_2$, or barium perchlorate, $Ba(ClO_4)_2$. Preferred compositions also include mixtures of ammonium nitrate and guanidine nitrate, nitroguanidine, tetramethyl ammonium nitrate, 5-aminotetrazole, and barbituric acid.

The preferred metal fuels are molybdenum, Mo, magnesium, Mg, calcium, Ca, strontium, Sr, barium, Ba, titanium, Ti, zirconium, Zr, vanadium, V, niobium, Nb, tantalum, Ta, chromium, Cr, tungsten, W, manganese, Mn, iron, Fe, cobalt, Co, nickel, Ni, copper, Cu, zinc, Zn, cadmium, Cd, tin, Sn, antimony, Sb, bismuth, Bi, aluminum, Al, cerium, Ce, and silicon, Si. These metals may be used alone or in combination.

The most preferred metal fuel, molybdenum, appears to be unique in its reactivity with nitrate, nitrite, chlorate and perchlorate salts, mixes and comelts. Molybdenum metal has reacted and autoignited with every oxidizer and oxidizer system of nitrates, nitrites, chlorates and perchlorates tested. Although the mechanism is not fully understood, there appears to be a sensitizing or catalytic interaction between molybdenum and nitrates, nitrites, chlorates and perchlorates.

The binary and ternary oxidizer systems can be mixed by physical or mechanical means, or can be comelted to produce a higher level of ingredient intimacy in the mix. Repetitive comelting, preferably 2 to about 4 times, produces the highest level of ingredient intimacy and mix homogeneity. The oxidizers in mechanical mixes should each be ground to an average particle size (APS) of about 100 microns or less prior to mixing, preferably about 5 to about 20 microns. Comelts of oxidizers should also be ground to less than about 100 microns APS, again, with a preferred APS of about 5 to about 20 microns. Average particle size of the metals used in the autoignition compositions should be about 35 microns or less with the preferred APS being less than about 10 microns. The reaction or burning rate and ease of autoignition increases as mix intimacy and homogeneity increases, and as the average particle size of the oxidizers and metals decreases. In other words, reaction rate and ease of autoignition are proportional to mix intimacy and homogeneity and inversely proportional to the average particle size of the oxidizer and metal components.

The autoignition temperature can be adjusted and tailored for specific uses by varying the amounts and types of the metal nitrates in the comelt and the specific metal used. For the majority of the compositions described herein, autoignition appears to occur very near a phase change. For example, a melting or crystal structure rearrangement of one of the oxidizers in a mechanical mix, or of the single oxidizer in simpler systems. In binary and ternary comelt systems, autoignition occurs near a eutectic or peritectic point. In all of the cases described above, the oxidizer softens or melts producing a kinetically favorable environment for reaction with the metal.

Each system of comelted oxidizers is unique. A simple binary system can have a single eutectic point, as described by the phase diagram of the system, that results in a single autoignition temperature for a specific metal/comelt composition. For example, a binary comelt of $LiNO_3/KNO_3$ with molybdenum will autoignite at 230° C.

Other more complicated binary and ternary comelts can have eutectic and peritectic points that result in several different autoignition temperatures for a specific metal/comelt system. The autoignition temperature of the composition is dependent on the molar ratio of the oxidizers in the comelt. For example, a binary comelt of $AgNO_3/KNO_3$ with molybdenum has an autoignition temperature near the peritectic point of 135° C. for comelts with less than 58 mole percent $AgNO_3$, based on the weight of the comelt, but has an autoignition temperature near the eutectic point of 118° C. for comelts with 58 mole percent $AgNO_3$ or higher.

The eutectic and peritectic melting points of a binary system tend to set the upper limit for any ternary system containing the specific binary combination of oxidizers. In other words, the melting point or eutectic of a ternary system cannot be higher than the lowest melting point of a binary combination within it.

In some cases certain non-energetic salts such as alkali and alkaline earth chlorides, fluorides and bromides can be comelted with selected nitrates, nitrites, chlorates and perchlorates to produce eutectics or peritectics preferably in the range of about 70° C. to about 250° C. These comelts will be combined with any one or more of the listed metals to produce the autoignition reaction. Selected nitrates, chlorates, or perchlorates may also be added to augment ignition and output.

A number of the autoignition compositions display mass effects that can affect the autoignition temperature. For example, a 6 mg sample of $LiClO_4/Mo$ will autoignite at 146° C. on a differential scanning calorimeter ("DSC") (1° C./min scan rate). This autoignition occurs just after a crystalline phase transition. On the other hand, a 2 mg sample does not autoignite until 237° C., which is just before the melting point of $LiClO_4$ (248° C.). To address these mass effects on a larger scale and also to test application size samples, typically about 50 to about 250 grams, a tightly temperature controlled tube furnace is used. This also provides a practical means of determining time to autoignition at a selected temperature for various sample sizes ranging from about 50 to about 250 grams.

The autoignition composition of the invention is preferably placed within a gas generating or pyrotechnic device, e.g., within an inflator housing, where, when the inflator is exposed to flame or a high temperature environment, it ignites, and initiates combustion of the pyrotechnic charge of the device at a device temperature that is lower than the temperature at which the device loses mechanical integrity. As the operating pressure of standard pyrotechnics increases with increasing temperature, a gas generating composition at its autoignition temperature will produce an operating pressure that is too high for a pressure vessel that was designed for minimum weight. Moreover, the melting point of many non-azide gas generating compositions is low enough for the gas generating composition to be molten at the autoignition temperature of the composition, which can result in a loss of ballistic control and excessive operating pressures. Therefore, during a vehicle fire where an autoignition material is not present, the ignition of the gas generating composition can result in an explosion in which fragments of the inflation unit are propelled at dangerous and potentially lethal velocities. With the autoignition compositions of the present invention, the combustion of the main pyrotechnic charge is initiated at a temperature below the temperature at which the material used to form the shell or housing begins to weaken or soften, and the uncontrolled combustion of the gas generating composition or pyrotechnic composition at higher temperatures is prevented, which could otherwise result in an explosion of the device. Preferred locations within the gas generating or pyrotechnic device include a cup or recessed area at the bottom of the housing of the device, a coating or pellet affixed to the inner surface of the housing, or inclusion as part of the squib used to ignite the gas generating composition or pyrotechnic composition during normal operation.

The foregoing features, aspects and advantages of the present invention will become more apparent from the following non-limiting examples of the present invention.

EXAMPLES

The determination of temperatures of autoignition, thermal decomposition, melting, eutectics and peritectics, crystalline rearrangements, etc. was performed on a Perkin-Elmer DSC-7 differential scanning calorimeter. Scanning rates ranged from 0.1° C./min to 100° C./min. Due to heat transfer effects at higher scan rates, the most accurate results were obtained at the slower scan rates (0.1 to 1.0° C./min). It should be noted, however, that the faster scan rates (50 to 100° C./min) are more representative of bonfire type heating.

Example 1

QNO$_3$/AN/Mo

The autoignition temperature was determined for each of a stoichiometric composition, an over oxidized composition, and an under oxidized composition, each composition comprising a mixture of Guanidine Nitrate (QNO$_3$), Ammonium Nitrate (AN), and Molybdenum metal (Mo). The stoichiometric composition comprised a mixture of 19.7 percent by weight Guanidine Nitrate, 64.7 percent by weight Ammonium Nitrate, and 15.6 percent by weight Molybdenum metal. A stoichiometric mixture of Guanidine Nitrate, Ammonium Nitrate, and Molybdenum metal reacts according to the equation:

$$CH_6N_4O_3 + 5NH_4NO_3 + Mo \rightarrow MoO_3 + 7N_2 + 13H_2O + CO_2.$$

A composition comprising 28.1% by weight QNO$_3$, 61.9% by weight AN and 10.0% by weight Mo, was slightly over oxidized, and a composition comprising 26.4% by weight QNO$_3$, 48.6% by weight AN and 25.0% by weight Mo was slightly under oxidized. Each of these compositions autoignited at 155±5° C. Preferred compositions of this type may comprise from about 10 to about 70 percent by weight Guanidine Nitrate, from about 10 to about 70 percent by weight Ammonium Nitrate, and from about 10 to about 45 percent by weight Mo.

Example 2

QNO$_3$/NQ/AN/Mo

The autoignition temperature was determined for stoichiometric and under oxidized compositions, each composition comprising a Nitroguanidine (NQ), Guanidine Nitrate, Ammonium Nitrate, and Mo. The stoichiometric composition comprised a mixture of 11.8 percent by weight Nitroguanidine (NQ), 13.8 percent by weight Guanidine Nitrate, 63.5 percent by weight Ammonium Nitrate, and 10.9 percent by weight Mo. A stoichiometric composition comprising Nitroguanidine, Guanidine Nitrate, Ammonium Nitrate, and Mo reacts according to the equation:

$$CH_6N_4O_3 + CH_4N_4O_2 + 7NH_4NO_3 + Mo \rightarrow MoO_3 + 11N_2 + 19H_2O + 2CO_2.$$

A composition comprising 13.4% by weight QNO$_3$, 13.4% by weight NQ, 63.2% by weight AN and 10.0% by weight Mo was slightly under oxidized, and a composition comprising 11.5% by weight QNO$_3$, 11.5% by weight NQ, 52.0% by weight AN and 25.0% Mo, was under oxidized. Each of the compositions tested autoignite at 155±5° C. Preferred compositions of this type comprise from about 5 to about 65 percent by weight Guanidine Nitrate, from about 5 to about 65 percent by weight Nitroguanidine, from about 10 to about 70 percent by weight Ammonium Nitrate, and from about 5 to about 45 percent by weight Mo Example 3

QNO$_3$/TMAN/AN/Mo

Compositions comprising Tetramethyl Ammonium Nitrate (TMAN), weight Guanidine Nitrate, Ammonium Nitrate, Mo were prepared. A stoichiometric composition comprising 8.3 percent by weight Tetramethyl Ammonium Nitrate (TMAN), 7.5 percent by weight Guanidine Nitrate, 78.3 percent by weight Ammonium Nitrate, and 5.9 percent by weight Mo reacts according to the equation:

$$CH_6N_4O_3 + C_4H_{12}N_2O_3 + 16NH_4NO_3 + Mo \rightarrow MoO_3 + 19N_2 + 41H_2O + 5CO_2.$$

A composition comprising 17.0% by weight QNO$_3$, 3.4% by weight TMAN, 69.6% by weight AN and 10% by weight Mo was substantially under oxidized, as was a composition comprising 17.2% by weight QNO$_3$, 3.3% by weight TMAN, 54.5% by weight AN and 25.0% by weight Mo. Each of these compositions will autoignite at 135±5° C. Preferred compositions of this type comprise from about 10 to about 50 percent by weight Guanidine Nitrate, from about 3 to about 15 percent by weight Tetramethyl Ammonium Nitrate, from about 10 to about 65 percent by weight Ammonium Nitrate, and from about 5 to about 45 percent by weight Mo.

Example 4

TMAN/AN/Mo

Compositions comprising Tetramethyl Ammonium Nitrate, Ammonium Nitrate, and Mo were prepared. A stoichiometric composition comprising 10.1 percent by weight Tetramethyl Ammonium Nitrate, 82.8 percent by weight Ammonium Nitrate, and 7.1 percent by weight Mo reacts according to the equation:

$$C_4H_{12}N_2O_3 + 14NH_4NO_3 + Mo \rightarrow MoO_3 + 15N_2 + 34H_2O + 4CO_2.$$

A composition comprising 8.7% by weight TMAN, 81.3% by weight AN and 10.0% by weight Mo, is slightly under oxidized, and a composition comprising 8.5% by weight TMAN, 66.5% by weight AN and 25.0% by weight Mo is substantially under oxidized. However, each of these compositions autoignites at 125±5° C. Preferred compositions of this type comprise from about 5 to about 20 percent by weight Tetramethyl Ammonium Nitrate, from about 35 to about 80 percent by weight Ammonium Nitrate, and from about 5 to about 45 percent by weight Mo.

Example 5

5-ATZ/KCLO$_3$/AN/Mo

Compositions comprising 5-Aminotetrazole (5-ATZ), Potassium Chlorate (KClO$_3$), Ammonium Nitrate, and Mo were prepared. A stoichiometric composition comprising a mixture of 22 percent by weight 5-Aminotetrazole (5-ATZ), 39.7 percent by weight Potassium Chlorate (KClO$_3$), 25.9 percent by weight Ammonium Nitrate, and 12.4 percent by weight Mo reacts, according to the equation:

$$4CN_5H_3 + 5KClO_3 + 5NH_4NO_3 + 2Mo \rightarrow$$
$$2MoO_3 + 15N_2 + 16H_2O + 4CO_2 + 5KCl.$$

A slightly under oxidized composition comprising about 20.8 percent by weight 5-ATZ, 43.4 percent by weight KClO$_3$, 20.8 percent by weight Ammonium Nitrate, and 15 percent Mo autoignites at 105±5° C. A substantially under oxidized composition comprising about 18.9 percent by weight 5-ATZ, about 32.3 percent by weight KClO$_3$, about 18.9 percent by weight Ammonium Nitrate, and about 30 percent Mo autoignites at 115±5° C. Preferred compositions of this type comprise from about 5 to about 45 percent by weight 5-ATZ, from about 5 to about 60 percent by weight KClO$_3$, from about 5 to about 70 percent by weight Ammonium Nitrate, and from about 5 to about 45 percent by weight Mo.

Example 6

5-ATZ/KP/AN/Mo

Compositions comprising 5-ATZ, Potassium Perchlorate (KClO$_4$), Ammonium Nitrate, and Mo were prepared. A stoichiometric composition comprising a mixture of 24.2 percent by weight 5-ATZ, 39.4 percent by weight Potassium Perchlorate (KClO$_4$), 22.8 percent by weight Ammonium Nitrate, and 13.6 percent by weight Mo according to the equation:

$$2CN_5H_3 + 2KClO_4 + 2NH_4NO_3 + Mo \rightarrow MoO_3 + 7N_2 7N_2O + 2CO_2 + 2KCl.$$

A very slightly under oxidized composition comprising about 23 percent by weight 5-ATZ, about 39 percent by weight KClO$_4$, about 23 percent by weight Ammonium Nitrate, and about 15 percent by weight Mo autoignites at a temperature of 175±5° C. Similarly, a more under oxidized composition comprising about 20.8 percent by weight 5-ATZ, about 28.4 percent by weight KClO$_4$, about 20.8 percent by weight Ammonium Nitrate, and about 30 percent Mo autoignites at a temperature of 165±5° C. Preferred compositions of this type comprise from about 5 to about 50 percent by weight 5-ATZ, from about 5 to about 60 percent by weight KClO$_4$, from about 5 to about 70 percent by weight Ammonium Nitrate, and from about 5 to about 45 percent by weight Mo.

Example 7

BA/KC10$_3$/AN/Mo

Compositions comprising Barbituric Acid (BA), KClO$_3$, Ammonium Nitrate, and Mo were prepared. A stoichiometric composition comprising 16.2 percent by weight Barbituric Acid (BA), 31.1 percent by weight KClO$_3$, 40.6 percent by weight Ammonium Nitrate, and 12.1 percent by weight Mo reacts according to the equation:

$$C_4N_2O_3H_4 + 2KClO_3 + 4NH_4NO_3 + Mo \rightarrow$$
$$MoO_3 + 5N_2 + 10H_2O + 4CO_2 + 2KCl.$$

An over oxidized composition comprising about 15.6 percent by weight Barbituric Acid, about 38.1 percent by weight KClO$_3$, about 31.3 percent by weight Ammonium Nitrate, and about 15 percent by weight Mo autoignites at 75±5° C., and a substantially under oxidized composition comprising about 17.7 percent by weight Barbituric Acid, about 19.1 percent by weight KClO$_3$, about 33.2 percent by weight Ammonium Nitrate, and about 30 percent by weight Mo autoignites at 85±5° C. Preferred compositions of this type comprise from about 5 to about 35 percent by weight Barbituric Acid, from about 5 to about 70 percent by weight KClO$_3$, from about 5 to about 75 percent by weight Ammonium Nitrate, and from about 5 to about 45 percent by weight Mo.

Example 8

BA/KP/AN/Mo

Compositions comprising Barbituric Acid, KClO$_4$, Ammonium Nitrate, and Mo were prepared. A stoichiometric composition comprising 19.4 percent by weight Barbituric Acid, 41.9 percent by weight KClO$_4$, 24.2 percent by weight Ammonium Nitrate, and 14.5 percent by weight Mo reacts according to the equation:

$$C_4N_2O_3H_4 + 2KClO_4 + 2NH_4NO_3 + Mo \rightarrow$$
$$MoO_3 + 3N_2 + 6H_2O + 4CO_2 + 2KCl.$$

A slightly over oxidized composition comprising about 17.1 percent by weight Barbituric Acid, about 33.8 percent by weight KClO$_4$, about 34.1 percent by weight Ammonium Nitrate, and about 15 percent by weight Mo autoignites at a temperature of 175±5° C., and a substantially under oxidized composition comprising about 18.7 percent by weight Barbituric Acid, about 16.2 percent by weight KClO$_4$, about 35.1 percent by weight Ammonium Nitrate, and about 30 percent by weight Mo autoignites at a temperature of 165±5° C. Preferred compositions of this type comprise from about 5 to about 40 percent by weight Barbituric Acid, from about 5 to about 65 percent by weight $KClO_4$, from about 5 to about 75 percent by weight Ammonium Nitrate, and from about 5 to about 45 percent by weight Mo.

The invention has also been successfully tested in timed autoignition tests at various temperatures, and in bonfire tests in prototype automobile air bag inflators.

While it is apparent that the disclosed invention is well calculated to fulfill the objectives stated above, it will be appreciated that numerous modifications and embodiments may be devised by those skilled in the art, and it is intended that the appended claims cover all such modifications and embodiments that fall within the true spirit and scope of the present invention.

We claim:

1. A method of safely initiating combustion of a gas generating composition or pyrotechnic composition in a gas generator or pyrotechnic device having a housing when the gas generator or pyrotechnic device is exposed to flame or a high temperature environment, the method comprising:

forming a low temperature autoignition composition having an autoignition temperature by mixing an oxidizer composition and a powdered metal fuel, wherein the oxidizer composition comprises a mixture or comelt comprising ammonium nitrate and at least one of an alkali metal nitrate, an alkaline earth metal nitrate, silver nitrate, a complex salt nitrate, a dried, hydrated nitrate, an alkali metal chlorate, an alkali metal perchlorate, an alkaline earth metal chlorate, an alkaline earth metal perchlorate, ammonium perchlorate, sodium nitrite, potassium nitrite, a solid organic nitrate, a solid organic nitrite, or a solid organic amine, wherein the metal fuel and oxidizer are present in amounts sufficient to provide an autoignition composition having an autoignition temperature of no more than about 232° C.; and placing the low temperature autoignition composition in thermal contact with the gas generating composition or pyrotechnic composition within the gas generator or pyrotechnic device, such that the low temperature autoignition composition autoignites and initiates combustion of the gas generating composition or pyrotechnic composition when the gas generator or pyrotechnic device is exposed to flame or a high temperature environment.

2. The method of claim 1, further comprising selecting the powdered metal fuel from the group consisting of molybdenum, magnesium, calcium, strontium, barium, titanium, zirconium, vanadium, niobium, tantalum, chromium, tungsten, manganese, iron, cobalt, nickel, copper, zinc, cadmium, tin, antimony, bismuth, aluminum, cerium, and silicon.

3. The method of claim 2, further comprising selecting the powdered metal fuel from the group consisting of molybdenum, magnesium, titanium, zirconium, niobium, nickel, chromium, zinc, aluminum, and cerium.

4. The method of claim 3, further comprising selecting the powdered metal fuel from the group consisting of molybdenum, magnesium, titanium, zirconium, zinc, and cerium.

5. The method of claim 4, further comprising selecting molybdenum as the powdered metal fuel.

6. The method of claim 5, further comprising mixing the molybdenum fuel with the oxidizer in an amount that is greater than the stoichiometric amount of molybdenum to decrease the autoignition temperature.

7. The method of claim 5, further comprising forming a comelt comprising ammonium nitrate as the oxidizer, and grinding the comelt to a particle size of about 10 to about 30 microns, and grinding the molybdenum powdered metal fuel to a particle size of less than about 6 microns.

8. The method of claim 1, further comprising selecting an oxidizer of a comelt or mixture comprising ammonium nitrate and at least one of guanidine nitrate, nitroguanidine, tetramethyl ammonium nitrate, 5-aminotetrazole, and barbituric acid.

9. The method of claim 8, further comprising forming the oxidizer by mixing ammonium nitrate with guanidine nitrate.

10. The method of claim 8, further comprising forming the oxidizer by mixing ammonium nitrate with nitroguanidine.

11. The method of claim 8, further comprising forming the oxidizer by mixing ammonium nitrate with tetramethyl ammonium nitrate.

12. The method of claim 8, further comprising forming the oxidizer by mixing ammonium nitrate with tetramethyl ammonium nitrate and guanidine nitrate.

13. The method of claim 8, further comprising forming the oxidizer by mixing ammonium nitrate with 5-aminotetrazole.

14. The method of claim 8, further comprising forming the oxidizer by mixing ammonium nitrate with 5-aminotetrazole and potassium chlorate.

15. The method of claim 8, further comprising forming the oxidizer by mixing ammonium nitrate with 5-aminotetrazole and potassium perchlorate.

16. The method of claim 8, further comprising forming the oxidizer by mixing ammonium nitrate with barbituric acid.

17. The method of claim 8, further comprising forming the oxidizer by mixing ammonium nitrate with barbituric acid and potassium chlorate.

18. The method of claim 8, further comprising forming the oxidizer by mixing ammonium nitrate with barbituric acid and potassium perchlorate.

19. The method of claim 1, further comprising mixing the low temperature autoignition composition with an output augmenting composition, the output augmenting composition comprising an energetic oxidizer of ammonium perchlorate, alkali metal chlorate, alkali metal perchlorate or alkali metal nitrate, in combination with a metal or boron, such that the low temperature autoignition composition autoignites and initiates combustion of the output augmenting composition, which initiates combustion of the gas generating composition or pyrotechnic composition when the gas generator or pyrotechnic device is exposed to flame or a high temperature environment.

20. The method of claim 19, further comprising selecting the metal for the output augmenting composition from the group consisting of Mg, Ti, and Zr.

21. The method of claim 1, further comprising mixing the low temperature autoignition composition with an output augmenting composition, which comprises an energetic oxidizer of ammonium perchlorate, alkali metal perchlorate or alkali metal nitrate, in combination with boron.

22. The method of claim 1, further comprising adding a metal oxide catalyst to the low temperature autoignition composition.

23. The method of claim 22, further comprising selecting the metal oxide catalyst from the group consisting of $Al_2O_3$, $SiO_2$, $CeO_2$, $V_2O_5$, $CrO_3$, $Cr_2O_3$, $MnO_2$, $Fe_2O_3$, $Co_3O_4$, $NiO$, $CuO$, $ZnO$, $ZrO_2$, $Nb_2O_5$, $MoO_3$, and $Ag_2O$.

24. The method of claim 1, further comprising forming the low temperature autoignition composition by forming a composition comprising from about 10 to about 70 percent by weight Guanidine Nitrate, from about 10 to about 70 percent by weight Ammonium Nitrate, and from about 10 to about 45 percent by weight Mo.

25. The method of claim 1, further comprising forming the low temperature autoignition composition by forming a composition comprising from about 5 to about 65 percent by weight Guanidine Nitrate, from about 5 to about 65 percent by weight Nitroguanidine, from about 10 to about 70 percent by weight Ammonium Nitrate, and from about 5 to about 45 percent by weight Mo.

26. The method of claim 1, further comprising forming the low temperature autoignition composition by forming a composition comprising from about 10 to about 50 percent by weight Guanidine Nitrate, from about 3 to about 15 percent by weight Tetramethyl Ammonium Nitrate, from about 10 to about 65 percent by weight Ammonium Nitrate, and from about 5 to about 45 percent by weight Mo.

27. The method of claim 1, further comprising forming the low temperature autoignition composition by forming a composition comprising from about 5 to about 70 percent by weight Tetramethyl Ammonium Nitrate, from about 35 to about 80 percent by weight Ammonium Nitrate, and from about 5 to about 45 percent by weight Mo.

28. The method of claim 1, further comprising forming the low temperature autoignition composition by forming a composition comprising from about 5 to about 45 percent by weight 5-ATZ, from about 5 to about 60 percent by weight $KClO_3$, from about 5 to about 70 percent by weight Ammonium Nitrate, and from about 5 to about 45 percent by weight Mo.

29. The method of claim 1, further comprising forming the low temperature autoignition composition by forming a composition comprising from about 5 to about 50 percent by weight 5-ATZ, from about 5 to about 60 percent by weight $KClO_4$, from about 5 to about 70 percent by weight Ammonium Nitrate, and from about 5 to about 45 percent by weight Mo.

30. The method of claim 1, further comprising forming the low temperature autoignition composition by forming a composition comprising from about 5 to about 35 percent by weight Barbituric Acid, from about 5 to about 70 percent by weight $KClO_3$, from about 5 to about 75 percent by weight Ammonium Nitrate, and from about 5 to about 45 percent by weight Mo.

31. The method of claim 1, further comprising forming the low temperature autoignition composition by forming a composition comprising from about 5 to about 40 percent by weight Barbituric Acid, from about 5 to about 65 percent by weight $KClO_4$, from about 5 to about 75 percent by weight Ammonium Nitrate, and from about 5 to about 45 percent by weight Mo.

* * * * *